United States Patent [19]
Himmelstein

[11] 3,961,526
[45] June 8, 1976

[54] ROTARY TORQUEMETER
[75] Inventor: Sydney Himmelstein, Lake Forest, Ill.
[73] Assignee: S. Himmelstein and Company, Elk Grove Village, Ill.
[22] Filed: Dec. 30, 1974
[21] Appl. No.: 537,248

Related U.S. Application Data
[63] Continuation of Ser. No. 355,973, April 30, 1973, abandoned.

[52] U.S. Cl. .............................................. 73/136 A
[51] Int. Cl.² ........................................ G01L 3/10
[58] Field of Search ...... 73/136 A, 88.5 R, 88.5 SD, 73/351

[56]  References Cited
UNITED STATES PATENTS

| | | | |
|---|---|---|---|
| 2,531,228 | 11/1950 | MacGeorge | 73/136 A |
| 2,548,397 | 4/1951 | Schaevitz | 73/136 A |
| 2,568,940 | 9/1951 | Wolf | 73/88.5 R |
| 3,519,969 | 7/1970 | Hoffman | 73/136 A X |
| 3,534,592 | 10/1970 | Paine | 73/88.5 R |
| 3,555,894 | 1/1971 | Bratkowski | 73/136 A X |
| 3,617,878 | 11/1971 | Senour | 73/88.5 R X |
| 3,717,029 | 2/1973 | Tveter | 73/136 A |
| 3,757,580 | 9/1973 | Crocker et al. | 73/136 A |
| 3,797,305 | 3/1974 | Haskell | 73/136 A |
| 3,824,845 | 7/1974 | Huebner | 73/88.5 R |

Primary Examiner—Charles A. Ruehl
Attorney, Agent, or Firm—Wegner, Stellman, McCord, Wiles & Wood

[57] ABSTRACT

A rotary torquemeter utilizing a rotary transformer means in conjunction with a strain gauge for indicating torque being transmitted through a drive means. The use of the rotary transformer permits the detection of the torque without mechanical coupling to the drive means. An improved strain responsive means utilizing a foil strain gauge is incorporated in the torquemeter for improved torque reading.

12 Claims, 3 Drawing Figures

ROTARY TORQUEMETER

This is a continuation of application Ser. No. 355,973, filed Apr. 30, 1973, now abandoned.

BACKGROUND OF THE INVENTION

1. Field of the Invention

This invention relates to rotary torquemeters, and in particular, to rotary torquemeters utilizing foil-type strain gauges.

2. Description of the Prior Art

In U.S. Pat. No. RE.26,501, issued to Sydney Himmelstein et al, and owned by the assignee hereof, a rotary transformer is illustrated for use in providing electrical signals from a rotating member. In the subsequent U.S. Pat. No. 3,531,748, of Richard S. Tveter et al and U.S. Pat. No. 3,717,029 of Richard S. Tveter, each of which patents is also owned by the assignee hereof, rotary torquemeters are disclosed utilizing such a rotary transformer in conjunction with a strain gauge. As shown in the wiring diagram of said Tveter et al U.S. Pat. No. 3,531,748, the rotary torquemeter utilizes a pair of such rotary transformers in transmitting a signal from an oscillator supply through the strain gauge carried on the rotating member to an output rotary transformer which is connected to a suitable signal receiving means for indicating or recording the output signal indicating the torque being transmitted through the rotary member.

In said Tveter U.S. Pat. No. 3,717,029, the torquemeter is disclosed as including a high performance wide band rotary transformer eliminating the need for resonant circuits and effectively precluding spurious signals being generated in the torquemeter control. As indicated in said torquemeter patents, the prior art teaches a number of different forms of torquemeter structures and includes the following U.S. Pat. Nos. 1,394,901 (Hobart); 2,283,942 (Morris); 2,894,231 (Krasno); 2,445,427 (Godsey, Jr.); 2,531,228 (Macgeorge); 2,548,397 (Schaevitz); 3,179,909 (Cheney); 3,317,873 (Himmelstein); 3,317,874 (Honsinger); and 3,348,181 (Stromswold).

Also included in the prior art as indicated in the above discussed patents, are the following foreign patents: Australia; Pat. No. 268,842 Canada; Pat No. 453,819 and Great Britain Pat. No. 784,733.

SUMMARY OF THE INVENTION

The present invention comprehends and improved rotary torquemeter having an improved strain responsive means.

More specifically, the present invention comprehends the provision of such a rotary torquemeter for indicating torque transmission in a rotary drive means having an input rotary transformer defined by a stator primary winding and a secondary winding carried by the drive means, an output rotary transformer defined by a primary winding carried by the drive means and a stator secondary winding, means for providing an input carrier signal to the input transformer, and means for receiving an output signal from the output transformer, an improved strain responsive means carried by the drive means for acting on the input carrier signal to provide a variable output signal corresponding to the amount of torque being transmitted through the drive means, the sensing means comprising a foil strain gauge carried by the drive means, an amplifier carried by the drive means, and circuit means connecting the strain gauge and amplifier in operable association with the transformer for providing to the receiving means a variable output signal corresponding to the amount of torque being transmitted by the drive means.

The amplifier may comprise a voltage amplifier. Illustratively, the amplifier may comprise a step-up transformer connected to the strain gauge and an operational amplifier connected between the step-up transformer and the output rotary transformer primary winding. The amplifier may be connected in the circuit as a voltage follower with unity gain.

Further illustratively, the strain responsive means may include a rectifier, a power supply transformer connected across the input transformer secondary winding and energizing the rectifier, and an operational amplifier connected to the strain gauge and rectifier.

In the illustrated embodiment, the amplifier may have a gain of approximately 5 to 30 where the carrier signal has a frequency in the range of approximately 1 kHz to 40 kHz. The amplifier may have a relatively high input impedance such as approximately $10^7$ to $10^{12}$ ohms. Further illustratively, the amplifier may have a low output impedance of approximately 10 ohms. The output signal may have a bandwidth of approximately 1 kHz to 40 kHz.

Alternatively, the amplifier may comprise a differential amplifier and may utilize a resistor network circuit for determining the voltage gain of the output signal.

The rotary torquemeter utilizing the improved strain responsive means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
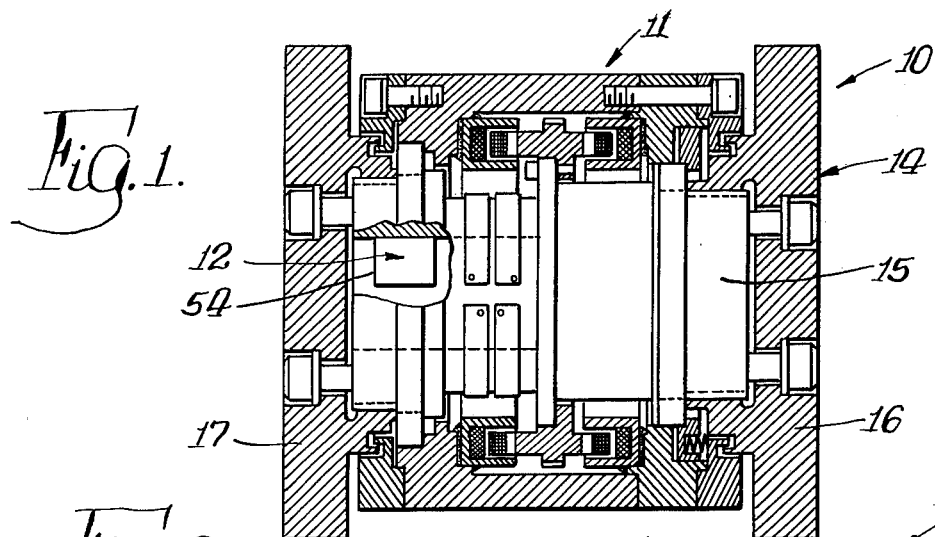
FIG. 1 is a diametric section of a rotary torquemeter embodying the invention.
Figure 2:
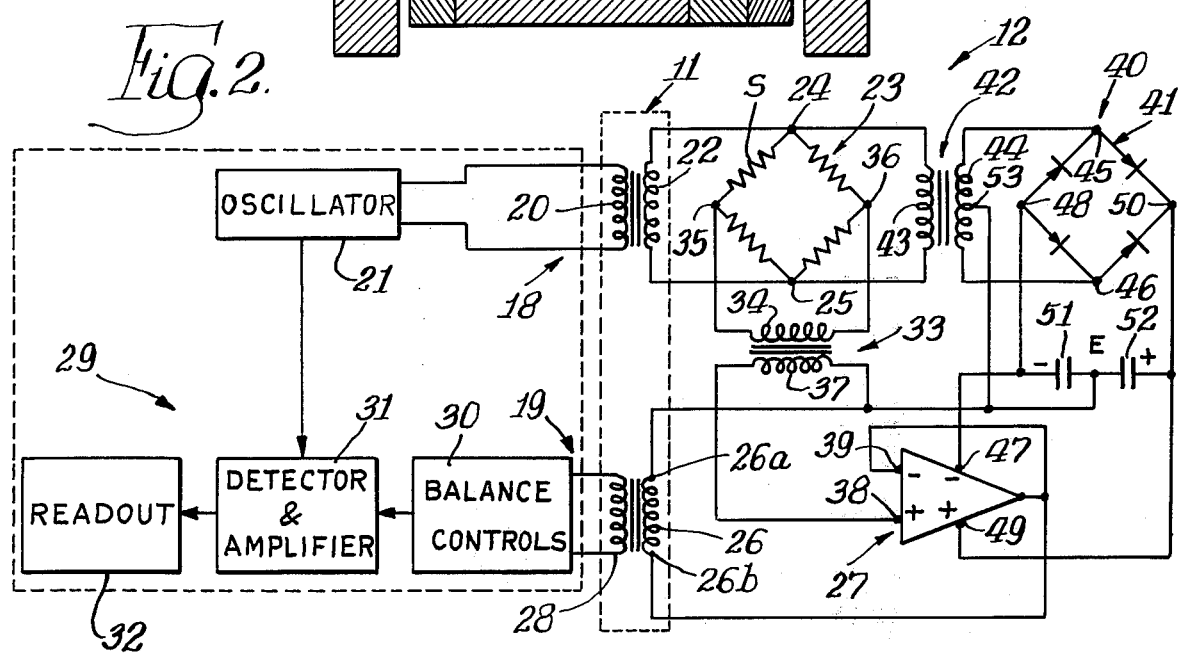
FIG. 2 is a schematic wiring diagram of the electrical circuit thereof.

In the exemplary embodiment of the invention as disclosed in FIGS. 1 and 2 of the drawing, a rotary torque-meter generally designated 10 is shown to comprise a rotary transformer means generally designated 11 and an improved strain responsive means generally designated 12 cooperating to provide an output signal corresponding to the amount of torque being transmitted through a drive generally designated 14 including a shaft 15 and connecting flanges 16 and 17 at opposite ends of the shaft.

The strain responsive means 12 acts on an input signal delivered thereto through a portion of the rotary transformer means 11 to provide an output signal to an output portion of the rotary transformer means 11 corresponding to the variable torque being transmitted through shaft 15. The present invention is concerned with providing an improved form of such a strain responsive means permitting the use of relatively low cost transformer means 11 while yet providing high accuracy in the desired torque readout.

As illustrated in FIG. 2, the rotary transformer means includes an input transformer 18 and an output transformer 19. Input transformer 18 is defined by a primary winding 20 connected to a suitable signal supply, herein a high frequency oscillator 21. The secondary winding 22 of input transformer 20 is connected across a strain gauge bridge 23 between terminals 24 and 25 thereof.

Output transformer 19 includes an input primary winding 26 connected to an amplifier generally designated 27, and an output secondary winding 28 connected to suitable signal receiving means generally designated 29 which, illustratively, may include balance controls 30, an indicator and amplifier means 31, and suitable readout means 32 which illustratively may comprise an indicator, a recorder, etc.

Strain gauge bridge 23 is further connected through a step-up transformer generally designated 33 to amplifier 27. As shown, the primary winding 34 of transformer 33 may be connected across terminals 35 and 36 and the secondary winding 37 of transformer 33 may have one end connected to output transformer winding 26 and the opposite end connected to the positive terminal 38 of amplifier 27. The negative terminal 39 of the amplifier may be connected to the opposite end 26b of output transformer winding 26.

Power is supplied to amplifier 27 from a power supply 40 also carried on shaft 15 which includes a full wave diode bridge rectifier 41. The rectifier may be energized by a suitable additional rotary transformer, or as illustrated in FIG. 2, may utilize a step-up transformer 42 connected across input transformer secondary winding 22. More specifically, the power supply transformer 42 may include a primary winding 43 connected across input transformer winding 22, and a secondary winding 44 connected between terminals 45 and 46 of the full wave bridge rectifier. Negative power supply terminal 47 of amplifier 27 may be connected to bridge rectifier terminal 48 and the positive terminal 49 of the amplifier 27 is connected to terminal 50 of the bridge rectifier. The power supply further includes capacitors 51 and 52 connected in series between rectifier terminals 48 and 50, and as shown in FIG. 2, end 26a of output transformer primary winding 26 is connected between capacitors 51 and 52.

Power supply transformer winding 44 is provided with a center tap 53 which is similarly connected to winding end 26a to complete the control circuit.

Transformer 42 permits utilization of optimum supply voltage for the strain gauge bridge 23 while providing desired high voltage for the power supply 40. Transformer 42 may comprise a conventional meter transformer. The power supply 40 including transformer 42 and capacitors 51 and 52, and the rotary amplifier 27 including operational amplifier 27 and transformer 33, may be mounted in a suitable enclosure 54 on shaft 15. The strain gauges S of bridge 23 herein comprise conventional foil strain gauge transducers of well known construction. Such foil-type strain gauges are known to have extremely high accuracy and, thus, improved accuracy in the provision of the torque readout is obtained while yet the rotary transformer means 11 may comprise a relatively low cost rotary transformer means having relatively high crosstalk between the transformer channels with minimum shielding against electrical ambient noise fields such as from rotating electric motors and generators, etc., which may be associated with the drive means. One attempted solution to the problem of crosstalk and ambient noise has been to use relatively expensive semiconductor strain gauges. The use of such semi-conductor strain gauges, however, is undesirable with respect to long term instability thereof and undesirable temperature performance.

Amplifier 27 may comprise any suitable conventional integrated circuit operational amplifier, such operational amplifiers being well known to those skilled in the art. Such amplifiers are manufactured by many companies, such as Burr-Brown Research Corp., Fairchild Camera & Instrument Corp., etc. Amplifier 27 herein is connected as a voltage follower having unity gain. The input 38, 39 is connected to the transformer winding 37 through the output transformer winding 26 so that amplifier 27 has an effective gain equal to the step-up ratio of transformer 33. Illustratively, transformer 33 may provide a voltage ratio of 5 to 30 times for carrier amplifier frequencies in the range of approximately 1 kHz to 40 kHz.

When so used in voltage follower configuration, amplifier 27 has a high input impedance in the range of approximately $10^7$ ohms to $10^{12}$ ohms where amplifier 27 utilizes FET transistors. Such an amplifier has been found to be extremely reliable while substantially eliminating loading effects.

The output of such an amplifier 27 has relatively low impedance, illustratively, approximately 10 ohms, and thus provides an excellent drive for the output transformer 19. Thus, the signal bandwidth is determined primarily by the characteristics of the rotary transformers 18 and 19 and transformer 33 so as to permit a typical bandwidth of from approximately 1 kHz to 40 kHz.

By eliminating resistor networks in connection with the amplifier 27, the gain of the amplifier is controlled solely by the step-up ratio of transformer 33 and, thus, is not affected by aging or temperature conditions. The use of the amplifier as a balanced operational amplifier in a unity gain configuration effectively causes amplifier 27 to be independent of the power supply voltage over a wide range, illustratively, of from approximately $\pm 5$ volts to $\pm 18$ volts. The gain is further independent of the open loop gain of the amplifier which typically may be from approximately 70 to approximately 110 decibels.

The use of the unity gain configuration eliminates the need for adjustments of amplifier offset. The elimination of the need for amplifying the offset further eliminates the otherwise provision of a significant direct current voltage at the output of the amplifier which is undesirable in consuming quiescent current.

In use, the oscillator 21 is operated to provide a carrier signal to strain gauge bridge 23 through the input transformer 18. The strain gauge, in turn, impresses on the carrier signal an output corresponding to the strain induced in shaft 15 by the transmission of torque therethrough. The strain signal is amplified by transformer 33 and amplifier 27 and delivered to the readout means 29 through the output rotary transformer 19. The readout is extremely accurate while yet the torquemeter 10 is extremely simple and economical of construction.

Figure 3:
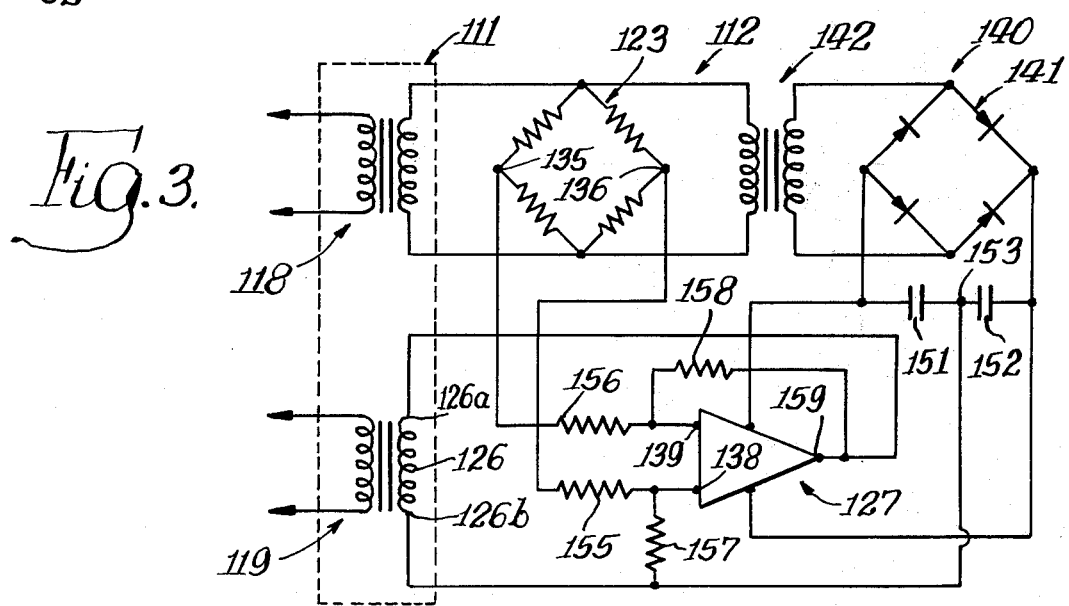
FIG. 3 is a schematic wiring diagram of a modified electrical circuit thereof.

Turning now to FIG. 3, a modified form of strain responsive means generally designated 112 is shown to be generally similar to strain responsive means 12, but utilizing a differential amplifier generally designated 127 in lieu of amplifier 27 to provide the improved readout. More specifically, the input terminals 138 and 139 of amplifier 127 may be connected through suitable resistors 155 and 156, respectively, to terminals 135 and 136 of the strain gauge bridge 123. Terminal 138 is further connected through a resistor 157 to transformer winding end 126b. Further, resistor 158 may be connected between amplifier terminal 139 and amplifier terminal 159 which is also connected to the end 126a of output transformer winding 126. In all other respects, strain responsive means 112 is similar to strain responsive means 12 and corresponding elements thereof are identified by similar reference numerals but 100 higher.

The resistance of resistor 156 is preselected to be equal to the resistance of resistor 155 and the resistance of resistor 158 is preselected to be equal to the resistance of resistor 157.

Differential amplifier 127 functions to provide a preselected voltage gain relative to the strain gauge bridge 123 which is a function of the ratio of the value of resistance of resistor 158 to the resistance of resistor 156.

Strain responsive means 112 differs in operation from strain responsive means 12 in that a common mode signal is provided in the use of the differential amplifier.

As discussed above relative to strain responsive means 12, power supply transformer 142 may be eliminated where use of the strain gauge bridge voltage is satisfactory, or a separate rotary transformer section may be utilized.

Strain responsive means 112 functions in a manner similar to that of strain responsive means 12 except as otherwise discussed above.

The foregoing disclosure of specific embodiments is illustrative of the broad inventive concepts comprehended by the invention.

I claim:

1. In a rotary torquemeter for indicating torque transmission in a rotary drive means, said torquemeter having an input rotary transformer defined by a stator primary winding and a secondary winding carried by said drive means, an output rotary transformer defined by primary winding carried by said drive means and a stator secondary winding, means for providing an input carrier signal to said input transformer, and means for receiving an output signal from said output transformer, an improved strain responsive means carried by said drive means for rotation therewith for acting on said input carrier signal to provide a variable output signal corresponding to the amount of torque being transmitted through said drive means, said strain responsive means comprising: foil strain gauge means carried by said drive means; an amplifier carried by said drive means; and circuit means connecting said strain gauge means and amplifier between the secondary winding of said input rotary transformer and the primary winding of said output rotary transformer for providing to said receiving means a variable output signal accurately corresponding to the amount of torque being transmitted by the drive means, said circuit means including a step-up transformer connected to said strain gauge means and said amplifier comprising an operational amplifier connected between said step-up transformer and said output rotary transformer primary winding.

2. The rotary torquemeter strain responsive means of claim 1 wherein said operational amplifier is connected as a voltage follower with unity gain.

3. The rotary torquemeter means of claim 1 wherein said amplifier has an input impedance of approximately $10^7$ to $10^{12}$ ohms.

4. The rotary torquemeter means of claim 1 wherein said amplifier has an output impedance of approximately 10 ohms.

5. The rotary torquemeter means of claim 1 wherein said carrier signal has a bandwidth of approximately 1 kHz. to 40 kHz.

6. The rotary torquemeter of claim 1 wherein said means for receiving an output signal from said output transformer includes a balance control means connected to said output rotary transformer stator secondary winding.

7. The rotary torquemeter of claim 1 wherein said rotary transformers comprise low cost transformers having relatively high crosstalk between the transformer channels.

8. The rotary torquemeter of claim 1 wherein said means for receiving an output signal from said output transformer includes a balance control means connected to said output rotary transformer stator secondary winding and a second amplifier.

9. In a rotary torquemeter for indicating torque transmission in a rotary drive means, said torquemeter having an input rotary transformer defined by a stator primary winding and a secondary winding carried by said drive means, an output rotary transformer defined by a primary winding carried by said drive means and a stator secondary winding, means for providing an input carrier signal to said input transformer, and means for receiving an output signal from said output transformer, an improved strain responsive means carried by said drive means for rotation therewith for acting on said input carrier signal to provide a variable output signal corresponding to the amount of torque being transmitted through said drive means, said strain responsive means comprising: foil strain gauge means carried by said drive means; an amplifier carried by said drive means; and circuit means connecting said strain gauge means and amplifier between the secondary winding of said input rotary transformer and the primary winding of said output rotary transformer for providing to said receiving means a variable output signal accurately corresponding to the amount of torque being transmitted by the drive means, said circuit means including a rectifier and a power supply transformer connected across said input transformer secondary winding and energizing said rectifier, and said amplifier comprising an operational amplifier connected to said strain gauge means and rectifier.

10. In a rotary torquemeter for indicating torque transmission in a rotary drive means, said torquemeter having an input rotary transformer defined by a stator primary winding and a secondary winding carried by said drive means, an output rotary transformer defined by a primary winding carried by said drive means and a stator secondary winding, means for providing an input carrier signal to said input transformer, and means for receiving an output signal from said output transformer, an improved strain responsive means carried by said drive means for rotation therewith for acting on said input carrier signal to provide a variable output signal corresponding to the amount of torque being transmitted through said drive means, said strain responsive means comprising: foil strain gauge means carried by said drive means; an amplifier carried by said drive means; and circuit means connecting said strain gauge means and amplifier between the secondary winding of said input rotary transformer and the primary winding of said output rotary transformer for providing to said receiving means a variable output signal accurately corresponding to the amount of torque being transmitted by the drive means, said amplifier comprising a voltage amplifier having a gain of approximately 5 to 30 with said input carrier signal having a frequency of approximately 1 kHz to 40 kHz.

11. The rotary torquemeter means of claim 9 wherein said amplifier comprises a differential amplifier.

12. The rotary torquemeter means of claim 9 wherein said amplifier comprises a differential amplifier utilizing a resistor network circuit determining the voltage gain of the output signal.

* * * * *